(12) United States Patent
Suzuki et al.

(10) Patent No.: US 8,014,645 B2
(45) Date of Patent: Sep. 6, 2011

(54) DISPERSION SHIFTED OPTICAL FIBER

(75) Inventors: Kazunori Suzuki, Yokosuka (JP);
Satoki Kawanishi, Yokohama (JP);
Hirokazu Kubota, Yokohama (JP);
Masatoshi Tanaka, Itami (JP);
Moriyuki Fujita, Itami (JP)

(73) Assignees: Nippon Telegraph and Telephone Corporation, Tokyo (JP); Mitsubishi Cable Industries, Ltd., Hyogo (JP)

( * ) Notice: Subject to any disclaimer, the term of this patent is extended or adjusted under 35 U.S.C. 154(b) by 1389 days.

(21) Appl. No.: 10/514,530

(22) PCT Filed: May 16, 2003

(86) PCT No.: PCT/JP03/06131
§ 371 (c)(1),
(2), (4) Date: Apr. 5, 2007

(87) PCT Pub. No.: WO03/098296
PCT Pub. Date: Nov. 27, 2003

(65) Prior Publication Data
US 2010/0266250 A1 Oct. 21, 2010

(30) Foreign Application Priority Data
May 17, 2002 (JP) .................... 2002-143758

(51) Int. Cl.
*G02B 6/028* (2006.01)
(52) U.S. Cl. ......... 385/124; 385/125; 385/122; 385/127
(58) Field of Classification Search .................. 385/124, 385/122, 125, 127
See application file for complete search history.

(56) References Cited

U.S. PATENT DOCUMENTS

| 6,097,870 A * | 8/2000 | Ranka et al. ............ 385/127 |
| 2001/0026667 A1 | 10/2001 | Kawanishi et al. ........ 385/125 |
| 2001/0038740 A1 | 11/2001 | Hasegawa et al. ......... 385/123 |
| 2002/0006256 A1 | 1/2002 | Inagaki et al. ............ 385/123 |

(Continued)

FOREIGN PATENT DOCUMENTS
EP 0 989 420 3/2000
(Continued)

OTHER PUBLICATIONS

T.M. Monro et al., *New Possibilities with Holey Fibers*, Optical Fiber Communication Conference Technical Digest, vol. 4, No. 4, Mar. 7, 2000, pp. 106-108.
K. Hansen et al., *Highly Nonlinear Photonic Crystal Fiber with Zero-Dispersion at 1.55 um*, OFC 2002 Postdeadline Papers, Mar. 2002, pp. FA9-1-FA9-3.

(Continued)

*Primary Examiner* — Ellen Kim
(74) *Attorney, Agent, or Firm* — Workman Nydegger

(57) ABSTRACT

A 1.55 μm band dispersion shifted optical fiber is provided which has a low loss and low dispersion slope. A core region "a" is heavily doped with $GeO_2$. A core region "b" is composed of pure $SiO_2$ glass. A cladding section is arranged around the core region. The cladding section has a lot of holes extending in the longitudinal direction of the optical fiber. The holes of the cladding section are not located at random, but have a honeycomb structure composed of regular hexagons which have a side length of Λ, and serve as a primitive lattice. The center of the core section has a region having a refractive index higher than that of the periphery of the core section. The core section has the refractive index distribution in which the group velocity dispersion at the operation wavelength of the region becomes the normal dispersion.

9 Claims, 12 Drawing Sheets

U.S. PATENT DOCUMENTS

2003/0142939 A1* 7/2003 Gorni et al. .................. 385/125
2009/0046984 A1* 2/2009 Mukasa ........................ 385/125

FOREIGN PATENT DOCUMENTS

| | | |
|---|---|---|
| JP | 11-326671 | 11/1999 |
| JP | 2001-059033 | 3/2001 |
| JP | 2001-318260 | 11/2001 |
| JP | 2002-031736 | 1/2002 |
| JP | 2002-145634 | 5/2002 |
| JP | 2003-230353 | 8/2003 |
| WO | WO 00/49436 | 8/2000 |
| WO | WO 01/31376 | 5/2001 |
| WO | WO 02/39161 A1 | 5/2002 |

OTHER PUBLICATIONS

M. Ohnishi et al., "Optimization of dispersion comepnsating fibers considering self-phase modulation suppression," OFC '96, ThA2 (1992).

L. Gruner-Nielsen et al., "New dispersion compensating fibres for simultaneous compensation of dispersion and dispersion slope of non-zero dispersion shifted fibres in the C or L band," OFC 2000, (2000).

K. Suzuki, et al., "Optical properties of a low-loss polarization maintaining photonic crystal fiber," Optics Express, vol. 9, No. 13, p. 676 (2001).

* cited by examiner

DISPERSION SHIFTED OPTICAL FIBER

TECHNICAL FIELD

The present invention relates to a dispersion shifted optical fiber, and more particularly to a dispersion shifted optical fiber utilized for optical communication networks and optical signal processing.

BACKGROUND ART

FIG. 10 is a cross-sectional view showing a structure of a conventional dispersion shifted photonic crystal fiber. In FIG. 10, the reference numeral 21 designates a core section, 23 designates a cladding section, 24 designates a hole and 25 designates a jacket section. The holes 24 in the cladding section 23 are not located at random, but have a honeycomb structure composed of regular hexagons which have a side length of Λ, and serve as a primitive lattice. Here, the diameter of the holes 24 is represented by d.

The optical fiber has an effective refractive index lower than the refractive index of the core section 21 because of the holes 24 in the cladding section 23 so that the mode guided through the core section 21 is confined and transmitted. To achieve wavelength dispersion characteristics that give zero dispersion at around the wavelength 1.55 μm in this structure, it is necessary for the waveguide dispersion due to the holes in the cladding section to compensate for the waveguide dispersion that compensates for the material dispersion of a material ($SiO_2$ glass, for example) constituting the optical fiber. This is achieved by setting Λ=1.6 μm and d=0.8 μm, for example.

FIG. 11 is a graph illustrating the wavelength dispersion characteristics of the conventional dispersion shifted optical fiber. FIG. 11 shows that the zero dispersion wavelength is present near the wavelength 1.55 μm. In addition, unlike the dispersion shifted optical fibers widely used as a medium for optical communication at present, it is characterized by that the dispersion slope (the gradient of the wavelength dispersion when the horizontal axis is wavelength) is negative.

The conventional dispersion shifted optical fiber, however, has the following drawbacks.

A first drawback is that since the dispersion slope utilizes a negative region (in which the dispersion reduces as the wavelength increases), the confinement effect of the propagation mode is weak, and the loss increases with an increase of the wavelength. In addition, as for a structure that modifies part of the optical fiber as shown in FIG. 10 by doping $GeO_2$ into the central portion of the core section so that a refractive index at that portion becomes higher than its periphery, it also has a drawback that the optical loss increases at longer wavelengths like the structure as shown in FIG. 10, when the zero dispersion is implemented by the effect of the structure dispersion in the cladding section.

FIG. 12 illustrates the loss wavelength characteristics of the dispersion-shifted fiber in this case (K. P. Hansen, et al., "Highly nonlinear photonic crystal fiber with zero dispersion at 1.55 μm", OFC 2002, Post Deadline Paper, FA9 (2002)).

In FIG. 12, the loss increases sharply from about 1.45 μm toward its longer wavelength side, and becomes a very large loss of about 100 dB/km at 1.6 μm. Similar characteristics have been obtained by computer analysis. In addition, since the weak optical confinement effect can easily bring about microbending loss, it is difficult to construct a low loss transmission line by a cable using the conventional technique. Furthermore, since a bending loss can easily occur because of the same reason, it is difficult to place the fiber in a small diameter when using the present optical fiber as an optical component.

A second drawback is that since the conventional dispersion shifted optical fiber has a small core diameter of about 2.4 μm as compared with a commonly used single-mode fiber with the core diameter of about 10 μm, or a commonly used optical fiber with the core diameter of 8-10 μm, the splice loss with these fibers is large of about a few decibels.

The present invention is implemented to solve the foregoing problems. Therefore it is an object of the present invention to provide a 1.55 μm band dispersion shifted optical fiber that has a low loss and low dispersion slope.

DISCLOSURE OF THE INVENTION

According to one aspect of the present invention, there is provided a dispersion shifted optical fiber comprising: a cladding section including a plurality of holes extending in a longitudinal direction and arrayed geometrically; and a core section having at its center a region whose refractive index is higher than a refractive index in a periphery of the core section, the core section having refractive index distribution in which group velocity dispersion at an operation wavelength in the region with the higher refractive index becomes normal dispersion.

The refractive index distribution of the core section may be substantially the same to refractive index distribution of a core section and cladding section of an optical fiber of one of matched cladding type, W-type, triple cladding type and quadruple cladding type.

At least one of a diameter or arrangement of the holes formed in the cladding section, a shape of the core section, and the refractive index distribution is less than three-fold axial symmetry with respect to a center of the core section.

The configuration makes it possible to implement the dispersion shifted optical fiber that has the zero dispersion and low dispersion slope at the wavelengths of 1.55 μm band by providing the central portion of the core section with the region having the high relative refractive index difference by adding dopant to the central portion, by forming holes in a lattice fashion in the cladding region of the dispersion compensated fiber having large negative dispersion (normal dispersion) in the 1.55 μm band, and by balancing the normal dispersion with the effect of the waveguide dispersion with large anomalous dispersion due to the holes. The dispersion slope of the waveguide dispersion caused by the effect of the holes is preferably positive or zero.

BEST MODE FOR CARRYING OUT THE INVENTION

The best mode for carrying out the invention will now be described with reference to the accompanying drawings.

Embodiment 1

Figure 1:
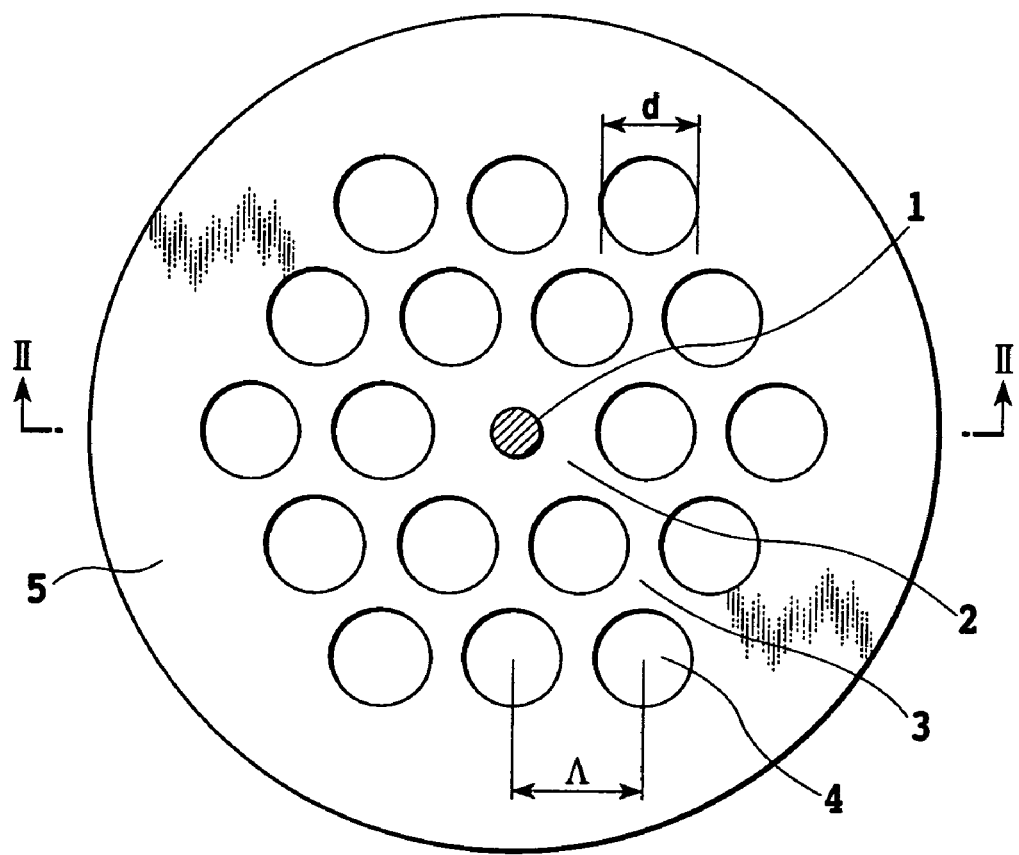
FIG. 1 is a cross-sectional view showing a structure of an embodiment 1 of the dispersion shifted optical fiber in accordance with the present invention.

FIG. 1 is a cross-sectional view showing a structure of an embodiment 1 of the dispersion shifted optical fiber in accordance with the present invention.

In FIG. 1, the reference numeral 1 designates a heavily $GeO_2$ doped core region "a"; 2 designates a core region "b" composed of pure $SiO_2$ glass; 3 designates a cladding section surrounding the core region; and 5 designates a jacket section. The cladding section 3 has a lot of apertures 4 (called holes 4 from now on) extending in the longitudinal direction of the optical fiber.

The holes 4 in the cladding section 3 are not located at random, but have a honeycomb structure composed of regular hexagons which have a side length of $\Lambda$, and serve as a primitive lattice. Here, the diameter of the holes 4 is represented by d.

Figure 2:
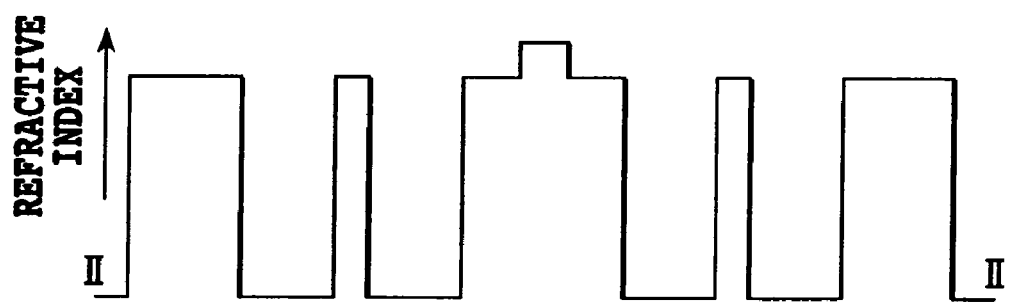
FIG. 2 is a diagram showing the refractive index distribution of the cross-section along a line II-II of FIG. 1.

FIG. 2 is a diagram showing the refractive index distribution of the cross-section along a line II-II of FIG. 1. The lowest level represents the refractive index of the holes (n=1). The core region "a" is formed by doping $GeO_2$ stepwise in such a manner that the diameter 2a becomes 3 μm, and the relative refractive index difference $\Delta$ becomes 2%, for example. Unless the holes 4 are present, the optical fiber has the normal dispersion at −22 ps/km/nm because of the effect of the waveguide dispersion of the optical waveguide including the core region "a" and core region "b", and of the effect of the material dispersion.

Forming the holes 4 regularly in the cladding section 3 causes sharp changes in the refractive index as illustrated in FIG. 2. The refractive index of the core region "b" and cladding section composed of $SiO_2$ glass is n=1.45. In contrast, the refractive index of the hole section 4 is n=1. The holes 4 reduce the average refractive index of the cladding section 3 (1<n<1.45), which helps the confinement of the light propagating through the core sections 1 and 2.

The holes 4 can bring about large positive structure dispersion (anomalous dispersion) in the mode propagating through the core section. The magnitude of the structure dispersion can be varied by selecting the spacing $\Lambda$ between the holes 4 and the diameter d of the holes 4 as parameters and by varying the parameters.

Figure 3:
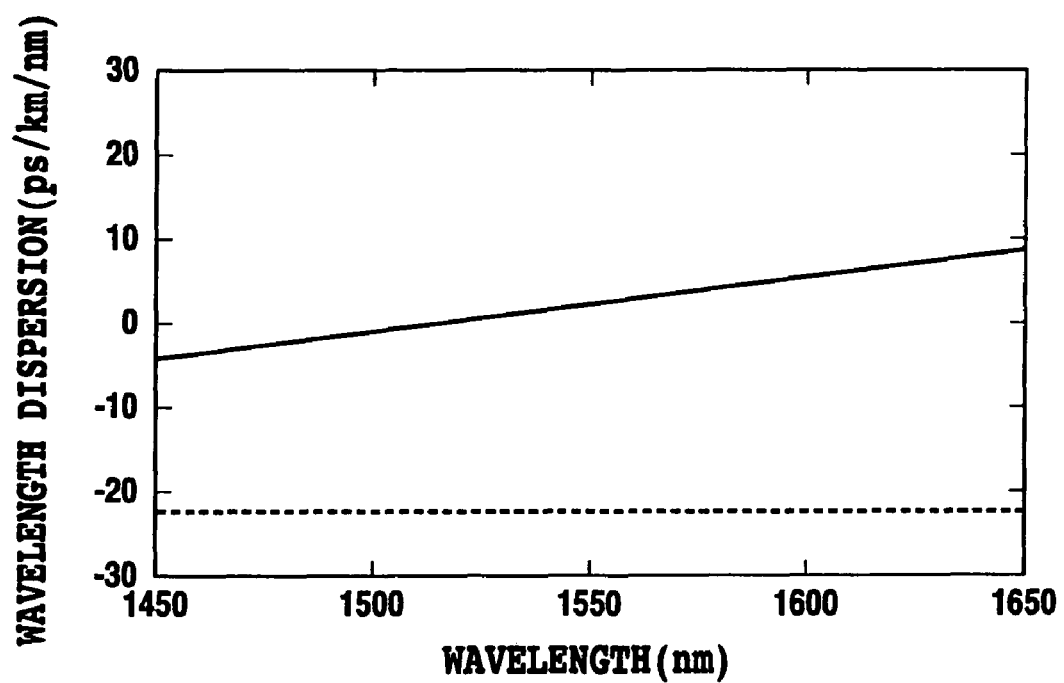
FIG. 3 is a graph illustrating an example of the wavelength dependence of the wavelength dispersion of the optical fiber as shown in FIG. 1.

For example, setting $\Lambda=5.6$ μm and d=2.8 μm can implement the dispersion-shifted fiber with the zero dispersion near the wavelength 1.55 μm. FIG. 3 illustrates the wavelength dispersion characteristics of the optical fiber. The dotted line in FIG. 3 represents the wavelength dispersion characteristics of the optical fiber without the holes, and the solid line represents the wavelength dispersion characteristics of the optical fiber with the holes with the foregoing magnitude.

As seen from FIG. 3, the wavelength dispersion characteristics can be obtained which have the zero dispersion at the wavelength 1.55 μm and the positive dispersion slope. The combination of the values $2a$, $\Delta$, $\Lambda$ and d that achieves the zero dispersion at the wavelength 1.55 μm is not limited to the foregoing values, but can be implemented in a variety of combinations.

Although the foregoing embodiment is described by way of example in which the core region "a" has a stepwise refractive index distribution, this is not essential. For example, square type, αth power type ($\alpha>2$), super Gaussian type refractive index distribution can also be employed.

Although the zero dispersion at the wavelength 1.55 μm can be achieved by reducing the spacing $\Lambda$ between the holes 4 to an order of the wavelength in the structure of FIG. 1, the structure markedly weakens the confinement of light propagating through the core region, thereby increasing the loss sharply.

Embodiment 2

Figure 4A:
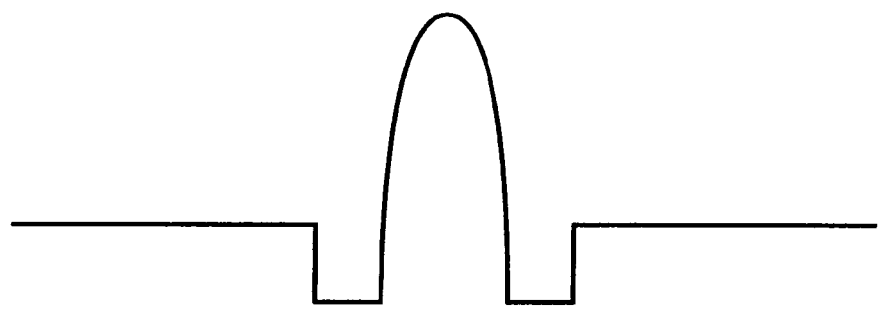
FIG. 4A is a diagram showing the refractive index distribution in the core section in accordance with the present invention, a diagram showing an example of a W-type (double cladding type)
Figure 4B:
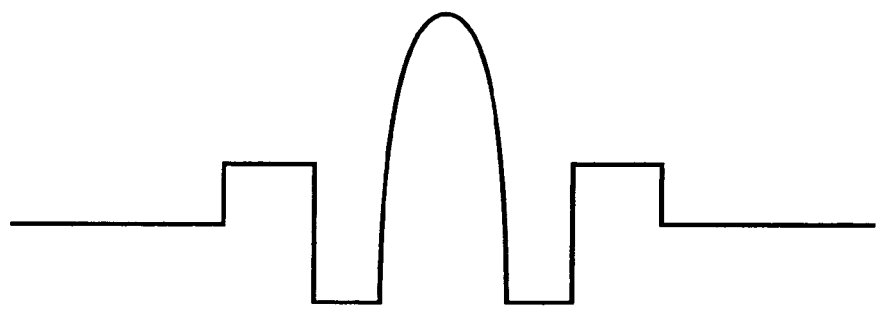
FIG. 4B is a diagram showing the refractive index distribution in the core section in accordance with the present invention, a diagram showing an example of a triple cladding type.

In the present embodiment 2 in accordance with the present invention, the refractive index distribution of the core section "a", which is the stepwise refractive index distribution in the embodiment 1, is made double cladding type or triple cladding type. FIGS. 4A and 4B show examples of the refractive index distribution: FIG. 4A shows double cladding type refractive index distribution; and FIG. 4B shows triple cladding type refractive index distribution. Except for the holes 4, the refractive index distribution of FIGS. 4A and 4B is equivalent to the refractive index distribution of a well-known dispersion compensated fiber. The refractive index distribution can implement an optical fiber with large normal dispersion.

Surrounding the core regions 1 and 2, which have the foregoing refractive index distribution, with the highly regularly arranged holes 4 can compensate for the normal dispersion caused by the contribution of the core region by the anomalous dispersion due to the arrangement of the holes 4, thereby being able to implement the fiber with the zero dispersion at the wavelength 1.55 μm. The dispersion slope of the anomalous dispersion due to the effect of the holes becomes positive as described in the foregoing embodiment 1.

The double cladding or triple cladding structures can make the dispersion slope negative around the wavelength 1.55 μm (M. Ohnishi et al., "Optimization of dispersion-compensating fibers considering self-phase modulation suppression", OFC' 96, ThA2 (1996), L. Gruner-Nielsen et al., "New dispersion compensating fibres for simultaneous compensation of dispersion and dispersion slope of non-zero dispersion shifted fibres in the C or L band", OFC 2000, (2000)).

Figure 5:
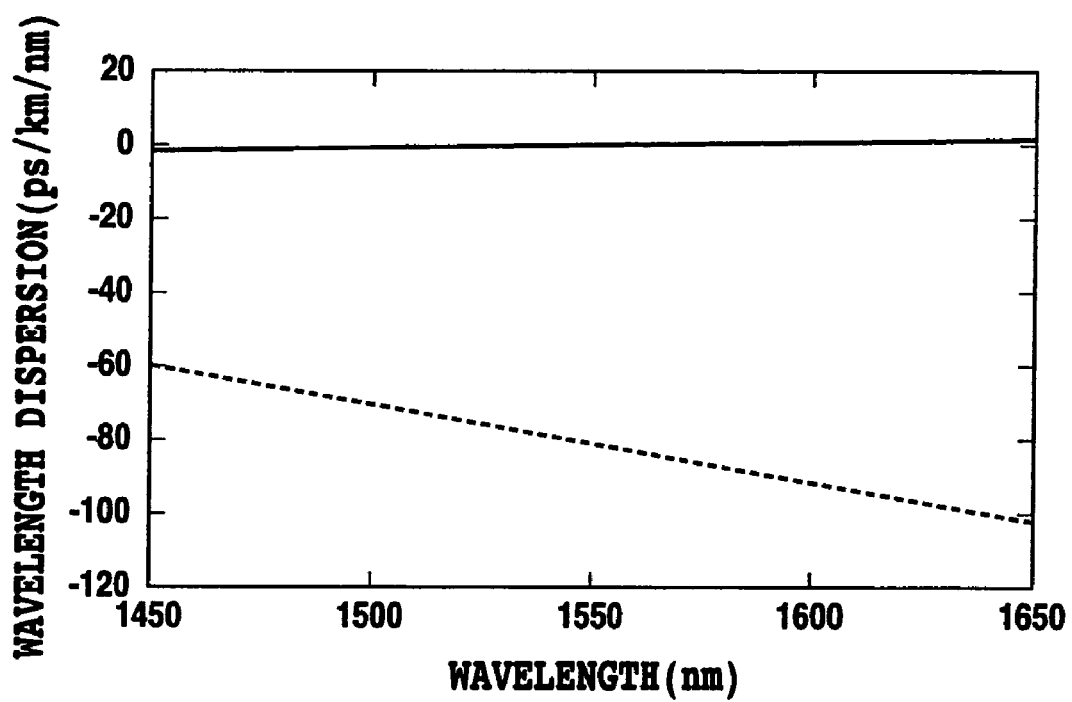
FIG. 5 is a graph illustrating the wavelength dispersion characteristics of an optical fiber formed according to an embodiment 2 in accordance with the present invention.

Therefore the positive dispersion slope due to the effect of the holes can be canceled out by the dispersion slope (negative dispersion slope) due to the refractive index distribution in the core region. Consequently, appropriately selecting the structural parameters of the fiber makes it possible to implement the optical fiber that has the zero dispersion and flat dispersion (zero dispersion slope) at the wavelength 1.55 μm. FIG. 5 illustrates the wavelength dispersion characteristics of the fiber in accordance with the present invention. The dotted line indicates the wavelength dispersion characteristics when the holes are not present, and the solid line indicates the wavelength dispersion characteristics of the present optical fiber.

The dispersion compensated fibers with the ordinary double cladding or triple cladding structure have a drawback that they easily bring about the microbending loss or bending loss because of the weak confinement effect of the propagation mode as compared with ordinary single mode fibers.

However, the optical fiber structure in accordance with the present invention can reduce the radiation mode loss and microbending loss due to bending of the optical fiber to a level sufficient for practical applications because the mode propagating through the optical fiber localized at the core regions 1 and 2 intensely, which are surrounded by the holes 4. Accordingly, the optical fiber can be formed to a cable in the conventional manner without causing any significant loss. This makes it possible to reduce the allowable bending radius as compared with the conventional fiber, thereby being able to increase the flexibility of the housing and routing of the fiber in a device.

Embodiment 3

Figure 6:
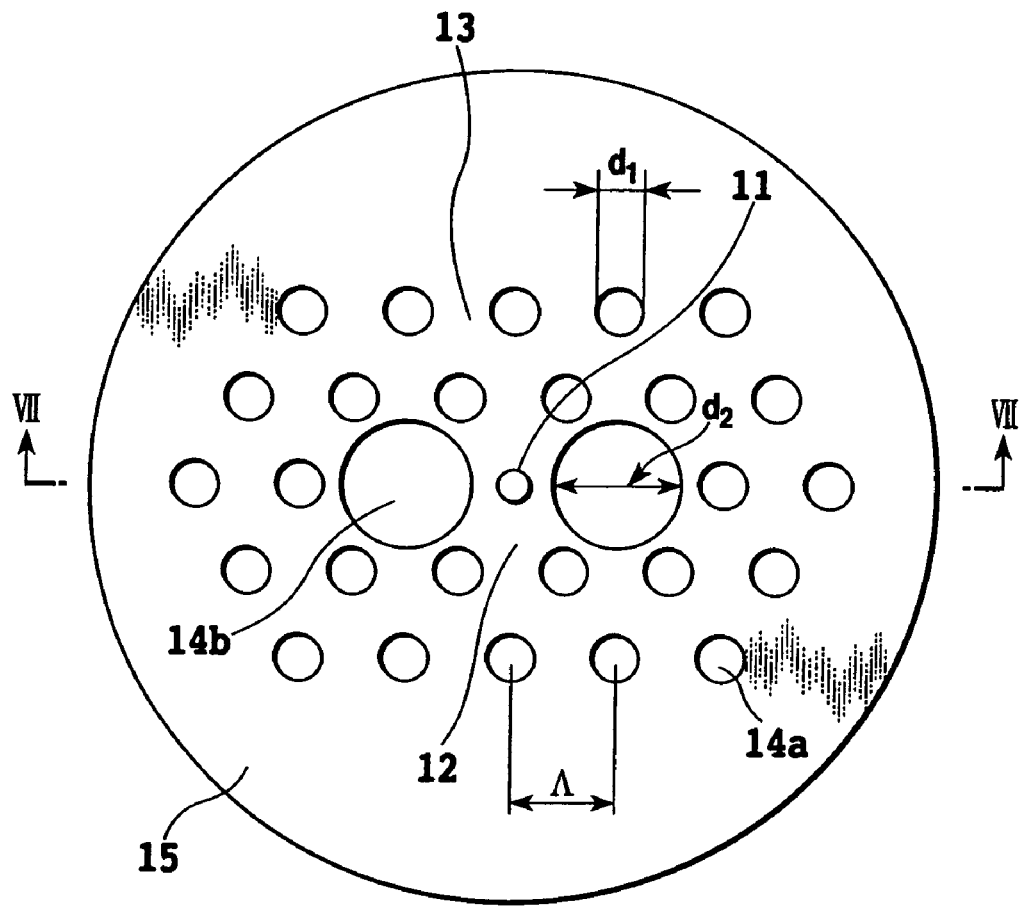
FIG. 6 is a cross-sectional view showing a structure of an embodiment 3 in accordance with the present invention.

FIG. 6 is a view showing the embodiment 3 in accordance with the present invention. In FIG. 6, the reference numeral 11 designates a core region "a" that is heavily doped with $GeO_2$; 12 designates a core region "b" composed of pure $SiO_2$; 13 designates a cladding section; 14a designates a hole "a"; 14b designates a hole "b"; and 15 designates a jacket section.

The holes "b" are placed in such a manner that they are adjacent to the core region, and has two-fold axial symmetry. The diameter of the holes b is made greater or less than that of the holes "a".

Figure 7:
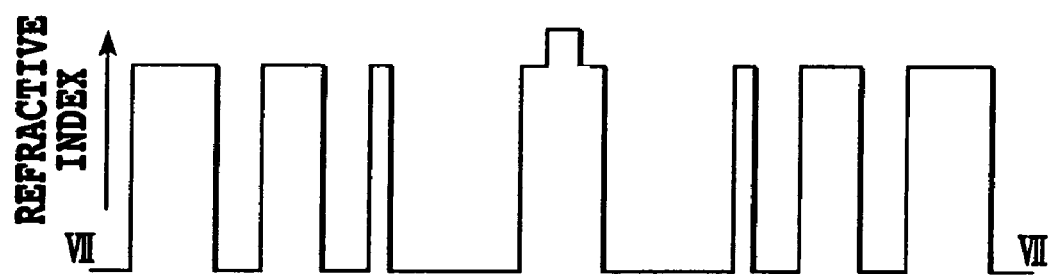
FIG. 7 is a diagram showing the refractive index distribution of the cross-section along a line VII-VII of FIG. 6.

FIG. 7 is a diagram showing the refractive index distribution of the cross-section along a line VII-VII of FIG. 6. That the holes "a" and "b" have different diameters brings about anisotropy in the equivalent refractive indices in the x and y axis directions of FIG. 7. As a result, the propagation mode polarized at the x and y directions, has large birefringence. The large birefringence reduces the polarization crosstalk from the x direction polarization mode to the y direction polarization mode or vice versa. As a result, the light propagates with the polarization mode in the x or y direction being maintained. An example when the refractive index of the core region "a" is equal to that of the core region "b" is disclosed in Kawanishi and Okamoto, "polarization maintaining optical fiber" (Japanese Patent Application Laid-open No. 2001-059033).

An example of the wavelength dispersion characteristics of the optical fiber fabricated according to the fiber structure disclosed in the foregoing reference is shown in K. Suzuki, et al., "Optical properties of a low-loss polarization maintaining photonic crystal fiber", Optics Express, vol. 9, No. 13, p. 676 (2001). According to the document, large anomalous dispersion of about +70 ps/km/nm can be achieved at the wavelength 1.55 μm.

To implement the zero dispersion of the fiber with such a structure at the wavelength 1.55 μm, it is necessary to heavily dope $GeO_2$ into the core region 1, to produce the negative waveguide dispersion (normal dispersion) based on the waveguide structure in the core region, and to compensate for the positive dispersion due to the holes. For example, the wavelength dispersion can be made zero near the wavelength 1.55 μm by setting the relative refractive index difference Δ of the core region "a" at 2%, the diameter of the core region "a" at 2.2 μm, the diameter of the holes "a" at 2 μm, the diameter of the holes "b" at 4 μm, and the spacing Λ between the holes at 4 μm.

Figure 8:
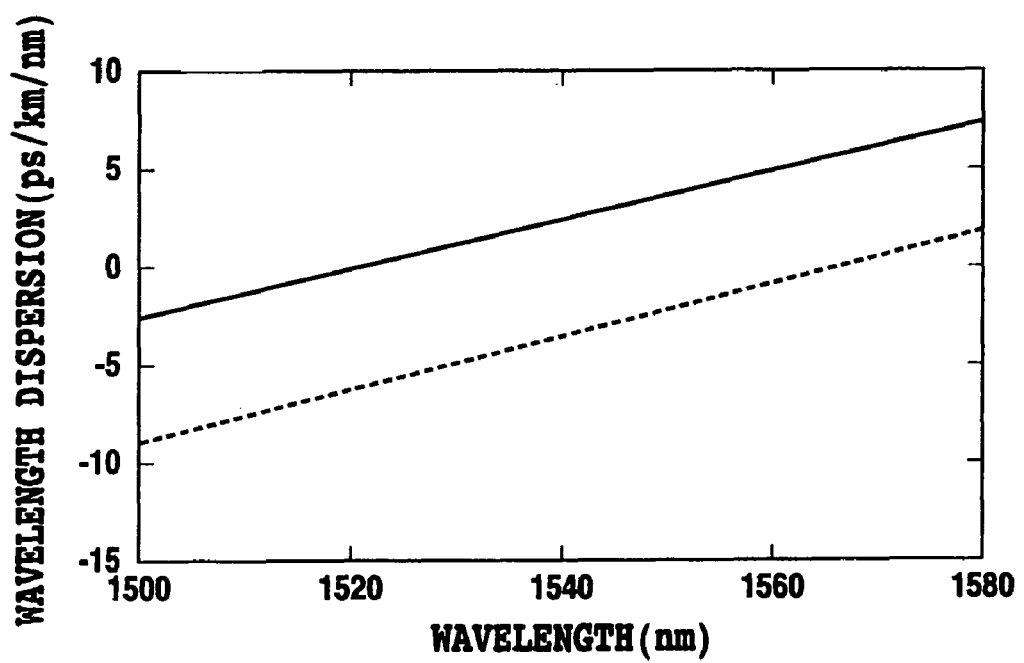
FIG. 8 is a graph illustrating the wavelength dispersion characteristics of the optical fiber of FIG. 6.

FIG. 8 is a graph illustrating the wavelength dispersion characteristics of the optical fiber. The solid line and dotted line represent the wavelength dispersion characteristics for the propagation modes having the polarization directions in the x and y directions, respectively. Although the zero dispersion wavelengths differ for the two modes, it is seen that the zero dispersion wavelengths are present near 1.55 μm. The difference between the two wavelength dispersion characteristics is due to the fact that the holes "a" and "b" have diameters greatly different from each other.

Although the foregoing embodiment assumes that the core region 11 has a stepwise refractive index distribution, this is not essential. For example, the square type, αth power type (α>2), and super Gaussian type refractive index distribution can also be employed.

Embodiment 4

The present embodiment 4 in accordance with the present invention is an example in which the refractive index distribution of the core section "a", which has the stepwise refractive index distribution in the embodiment 3, is made double cladding type or triple cladding type. FIGS. 4A and 4B show examples of the refractive index distribution. As described before in the embodiment 2, the wavelength dispersion characteristics of the optical fiber with such refractive index distribution can be determined such that they have the normal dispersion (negative) and negative dispersion slope near the wavelength 1.55 μm by selecting appropriate structural parameters.

Figure 9:
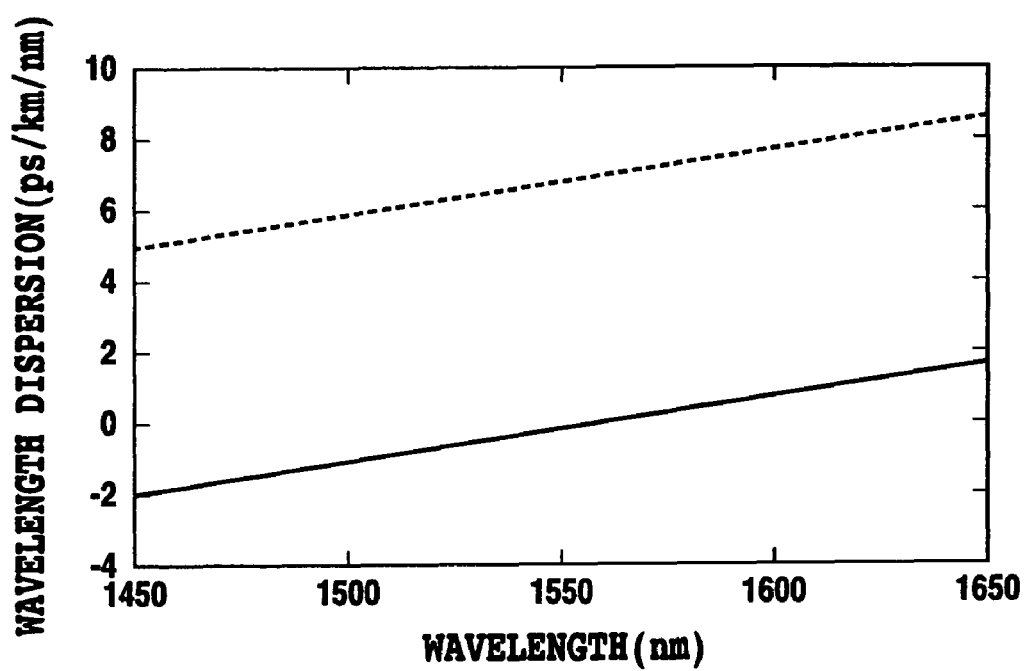
FIG. 9 is a graph illustrating the wavelength dispersion characteristics of an optical fiber of an embodiment 4 in accordance with the present invention.
Figure 10:
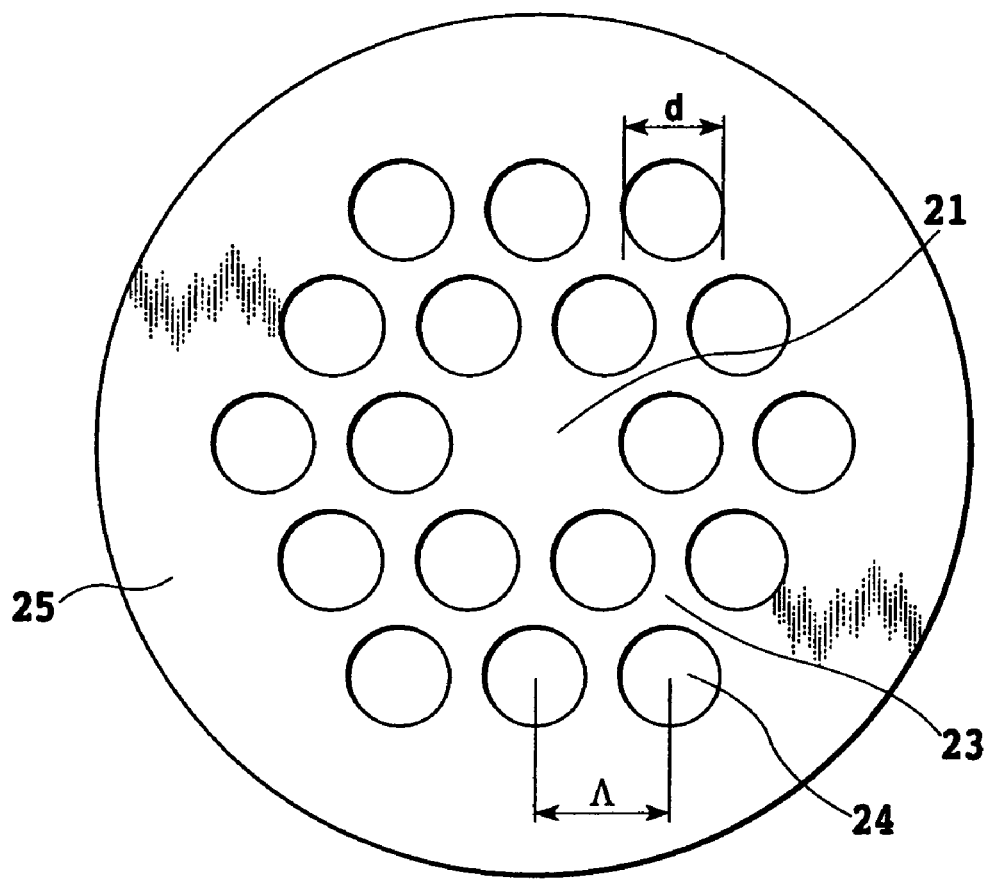
FIG. 10 is a cross-sectional view of a conventional dispersion shifted optical fiber.
Figure 11:
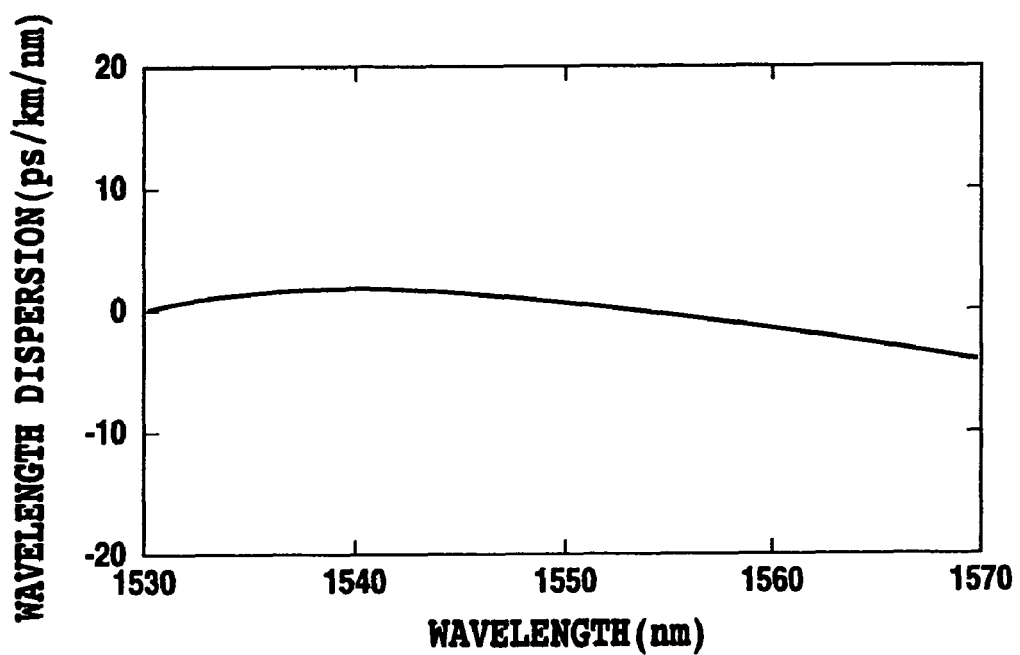
FIG. 11 is a graph illustrating an example of the wavelength dispersion characteristics of the conventional optical fiber.
Figure 12:
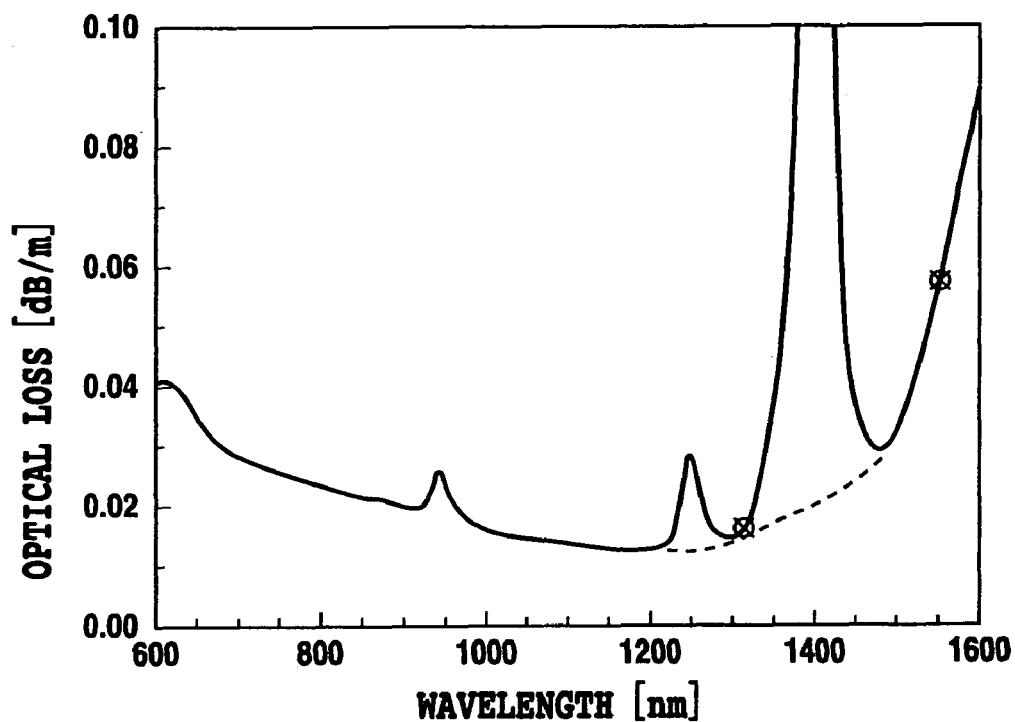
FIG. 12 is a graph illustrating the loss wavelength characteristics of the conventional optical fiber.

Applying the refractive index distribution in the core section to the optical fiber of the embodiment 3 can simultaneously compensate for the anomalous dispersion (positive dispersion) and positive dispersion slope caused by the holes in the cladding section, thereby being able to implement the dispersion shifted optical fiber which has the zero dispersion and low dispersion slope at the wavelength 1.55 μm. FIG. 9 illustrates an example of the wavelength dispersion characteristics of the optical fiber fabricated according to the structure.

In FIG. 9, the solid line and dotted line indicate the wavelength dispersion characteristics of two polarization modes orthogonal to each other. In this case, one of the two orthogonal propagation modes has zero dispersion at the wavelength 1.55 μm, and the dispersion slope of 0.02 ps/km/nm, which is equal to or less than one third of the ordinary dispersion shifted optical fiber.

As for the optical fiber with the structure of the present embodiment, there is no increase of the optical loss by the bending with the diameter of about 10 mm because of the strong confinement of the propagation mode. In addition, there is no increase of the loss on the longer wavelength side caused by the gradual reduction in the confinement of the propagation mode on the longer wavelength side.

INDUSTRIAL APPLICABILITY

The dispersion shifted optical fiber can be implemented which has strong confinement effect of the propagation mode because it has around the core section a region with the refractive index higher than that of the periphery of the core section, and has the refractive index distribution in the core section, in which the group velocity dispersion at the operation wavelength of the region becomes the normal dispersion. In addition, since the optical loss due to the bending of the optical fiber is hard to occur, housing of the optical fiber in accordance with the present invention in a device can downsizing the device. Furthermore, optimizing the refractive index distribution of the core section makes it possible to implement a low dispersion optical fiber in a wide wavelength range, thereby being able to improve the characteristics of optical devices using the optical fiber.

What is claimed is:

1. A dispersion shifted optical fiber comprising:
    a cladding section including a plurality of holes extending in a longitudinal direction and arrayed geometrically; and
    a core section having at its center a region whose refractive index is higher than a refractive index in a periphery of said core section, said core section being configured to have a propagation mode and a normal dispersion at an operation wavelength of 1.55 µm if no holes were present in the cladding section, and said cladding section being configured with the plurality of holes to compensate the normal dispersion of the core section at the operation wavelength and further configured with a positive dispersion slope at the operation wavelength to increase confinement effect and decrease loss at higher operation wavelengths.

2. The dispersion shifted optical fiber according to claim 1, wherein the refractive index distribution of said core section is substantially the same as the refractive index distribution of a core section and cladding section of an optical fiber of one of a matched cladding type, a double cladding type, a triple cladding type and a qua-druple cladding type.

3. The dispersion shifted optical fiber according to claim 1, wherein at least one of said holes formed in said cladding section, a shape of said core section, and the refractive index distribution has less than three-fold axial symmetry with respect to a center of said core section.

4. A dispersion shifted optical fiber comprising:
    a core section having at its center a region whose refractive index is higher than a refractive index in a periphery of said core section; and
    a cladding section surrounding the core section, the cladding section having a plurality of holes extending longitudinally through the fiber and arrayed geometrically so as to compensate for a normal dispersion of the core section at an operation wavelength of 1.55 µm, the fiber having a positive dispersion slope at the operation wavelength to increase confinement effect and decrease loss at higher operation wavelengths.

5. A dispersion shifted optical fiber comprising:
    a core section having at its center a region whose refractive index is higher than a refractive index in a periphery of said core section; and
    a cladding section surrounding the core section, the cladding section having a plurality of holes extending longitudinally through the fiber and arrayed geometrically so as to compensate for a normal dispersion of the core section at an operation wavelength of 1.55 µm.

6. The dispersion shifted optical fiber according to claim 5, wherein the fiber has a dispersion of zero at the operation wavelength.

7. The dispersion shifted optical fiber according to claim 5, wherein the fiber has a zero dispersion slope at the operation wavelength.

8. The dispersion shifted optical fiber according to claim 5, wherein the cladding section comprises one of a matched cladding type, a double cladding type, a triple cladding type and a quadruple cladding type.

9. The dispersion shifted optical fiber according to claim 5, wherein the holes are arranged in a honeycomb structure.

* * * * *